3,414,605
SYNTHESIS OF ACRYLONITRILE USING
SILICIDE CATALYST
Darrell W. Walker, Bartlesville, Okla., assignor to Phillips
Petroleum Company, a corporation of Delaware
No Drawing. Filed Nov. 10, 1965, Ser. No. 507,249
5 Claims. (Cl. 260—465.3)

ABSTRACT OF THE DISCLOSURE

A process for the preparation of acrylonitrile wherein acetylene and hydrogen cyanide are reacted in the presence of a metal silicide catalyst under suitable reaction conditions to provide said acrylonitrile.

---

This invention relates to a process for forming acrylonitrile from hydrogen cyanide and acetylene in contact with metal silicide catalysts.

Acrylonitrile is a useful polymerizable material and it has been synthesized from hydrogen cyanide and acetylene using various types of catalysts.

This invention is concerned with the synthesis of acrylonitrile from hydrogen cyanide and acetylene using certain metal silicides as catalysts.

Accordingly, it is an object of the invention to provide a novel process for synthesizing acrylonitrile. Another object is to provide novel catalysts for the synthesis of acrylonitrile from hydrogen cyanide and acetylene. Other objects of the invention will become apparent to one skilled in the art upon consideration of the accompanying disclosure.

A broad aspect of the invention comprises contacting a mixture of hydrogen cyanide and acetylene under reaction conditions with at least one metal silicide in which the metal is a member of the group consisting of Li, Na, K, Rb, Be, Mg, Ca, Sr, Ba, and Cu.

A number of metals form silicides. Frequently these compounds have stoichiometric formulas which bear little resemblance or conformity to the usual valences of the elements involved. Some metals form more than one silicide. Some silicides of Group I and Group II have been found to be effective in promoting the addition of hydrogen cyanide to acetylene. Some examples of the silicides are $CaSi_2$, CaSi, $Ca_2Si$, $Ca_3Si_2$, $Cu_4Si$, $Cu_5Si$, $Cu_3Si$, $Cu_{31}Si_8$ $Li_6Si_2$, $Li_3Si$, $NaSi_2$, $KSi_8$, $RbSi_8$, BaSi, $BaSi_3$, $BaSi_2$, SrSi, $SrSi_2$, MgSi, and $Mg_5Si_3$.

Such metal silicides are known in the art and are prepared by conventional means. For example, calcium silicide can be prepared by the reduction of lime and silicon dioxide as shown in the following chemical equation $$CaO + 2SiO_2 + 5C \rightarrow CaSi_2 + 5CO$$

Metal silicides can also be prepared by dissolving silicon in the molten metal.

The silicides are generally hard metallic-appearing crystals which can be ground and reduced to a size suitable for a fluidized process. Generally, a mesh size of about 50–325 is suitable for use in a fluidized reactor. Before use in the reactor, the catalytic silicide is preferably treated by heating in the presence of hydrogen or another inert gas at temperatures above about 900° F. and below about 1500° F. for a period of 0.1 to 30 hours.

According to the process of the invention, the hydrogen cyanide is contacted with the acetylene in the presence of the silicide catalyst using any conventional contacting apparatus. Both fixed bed operations and fluidized bed operations are suitable but the latter is generally preferred. The contacting is carried out within the broad temperature range of about 650 to about 1000° F. at any convenient pressure including atmospheric pressure.

High gaseous hourly space velocities promote the desired reaction to some degree but at the expense of lower conversions of feed material. Generally, the gaseous hourly space velocity will be in the broad range of about 50 to about 1500 v./v./hour. The ratio of hydrogen cyanide to acetylene in the feed stream can vary over a wide range but will generally approximate the stoichiometric proportion. An excess of acetylene is usually beneficial. Other gases such as hydrogen or inert gases such as nitrogen can also be present in the feedstream.

The effluent from the reaction is treated conventionally to isolate the acrylonitrile. For example, the acrylonitrile can be recovered by water washing the effluent stream. Unconverted hydrogen cyanide and acetylene can be recycled if desired. Other nitrile by-products which are obtained in varying degrees in the process are acetonitrile and propionitrile.

The invention is further illustrated by the following example which is not to be construed as unnecessarily limiting the invention.

EXAMPLE

A 3 cc. (3.9807 g.) quantity of $CaSi_2$, having a mesh size of 50–325, was heated in a flowing stream of hydrogen at 930° F. for 2 hours in a fluidized reactor which consisted of a 6–7 mm. ID Pyrex tube which was fitted with a fritted disk support for the catalyst bed. After the hydrogen treatment the catalyst charge was contacted with a flow of hydrogen cyanide and acetylene-containing feed. This feedstream contained 12.66 mole percent hydrogen cyanide, 11.43 mole percent acetylene, with the remainder being hydrogen. A 2.1 hour run was thus carried out at a temperature of 920–930° F., at a space rate of 1170 v./v./hour and at atmospheric pressure. During this period, 0.977 gram acetylene, and 1.1250 grams of hydrogen cyanide were passed through the reactor yielding 0.0289 gram liquids. Acrylonitrile accounted for 63.5 weight percent of the liquids. The overall selectivity, based on all of the material converted, was 11 percent to acrylonitrile. The overall conversion of the feed was 7.9 percent. Major impurities in the liquids produced were benzene, acetonitrile, and propionitrile. The catalyst fluidized well all during the run.

Certain modifications of the invention will become apparent to those skilled in the art and the illustrative details disclosed are not to be construed as imposing unnecessary limitations on the invention.

I claim:
1. A process for making acrylonitrile which comprises reacting at a temperature of about 650 to about 1000° F. a mixture of hydrogen cyanide and acetylene in contact with a catalyst consisting essentially of at least one metal silicide in which the metal is a member of the group Li, Na, K, Rb, Be, Mg, Ca, Sr, Ba, and Cu, to form acrylonitrile, and recovering the resulting acrylonitrile.
2. The process of claim 1 wherein said catalyst is of a mesh size in the range of 50–325 and said catalyst is contacted in a fluidized bed thereof with a vapor stream comprising essentially hydrogen cyanide and acetylene.
3. The process of claim 2 wherein said catalyst is essentially $CaSi_2$.
4. The process of claim 1 wherein said catalyst is pretreated with $H_2$ at a temperature of at least 900° F. and below about 1500° F. for a period in the range of 0.1 to 30 hours.

5. The process of claim 1 wherein the said mixture is reacted at a temperature of 650° to 1000° F. at a gaseous hourly space velocity of 50 to 1500 v./v./hour, and wherein the ratio of acetylene to hydrogen cyanide approximates the stoichiometric proportion.

References Cited

UNITED STATES PATENTS

| 2,414,762 | 1/1947 | Owen et al. | 260—465.3 |
| 2,854,473 | 9/1958 | Spaulding et al. | 260—465.3 |

JOSEPH P. BRUST, *Primary Examiner.*